Oct. 12, 1926.

J. FLAM

VALVE

Filed Oct. 20, 1925

1,603,005

INVENTOR
John Flam

Patented Oct. 12, 1926.

1,603,005

UNITED STATES PATENT OFFICE.

JOHN FLAM, OF LOS ANGELES, CALIFORNIA.

VALVE.

Application filed October 20, 1925. Serial No. 63,680.

This invention relates to a valve, and more particularly to one that may be used for the control of a fluid under pressure such as water or steam.

In prior forms of valves, it is usual to provide a valve stem, carrying a closure member, arranged to cooperate with a valve opening. The valve stem is usually reciprocated by the aid of a screw connection between the stem and a relatively stationary portion of the valve body. Such valves are expensive to manufacture, since packing must be arranged around the valve stem, to prevent the egress of liquid or fluid.

In order to overcome this inconvenience, which is especially undesirable in connection with the flow of steam to radiators used for the purpose of heating rooms, it has also been proposed to provide an expansible diaphragm of an easily pliable non-resilient material such as copper. This diaphragm can be connected to one end of the stem and forms a fluid tight chamber separating this valve stem from the valve opening. The valve stem however serves to alter the form of this diaphragm, and thereby to operate the valve. Such devices are disadvantageous on account of the fact that a considerable force must be exerted by the valve stem to alter the form of the diaphragm, rendering the valve difficult to operate; furthermore, the structure is expensive.

It is thus one of the objects of my invention to provide a packless valve that is not only inexpensive to manufacture, but is easy to operate.

It is another object of my invention to make it possible to operate a valve with a rapid rate of movement externally of the valve chamber. These objects I am enabled to accomplish by the aid of a buckled spring diaphragm member, which serves not only to provide a tight closure for the valve, but by its resilience, serves to move the valve closure by a substantial amount when it buckles from one stable position to the other.

It is still another object of my invention to provide an operating device for the diaphragm that obviates the danger of accidental opening of the valve in response to the pressure of the fluid exerted against it.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings.

Figure 1:
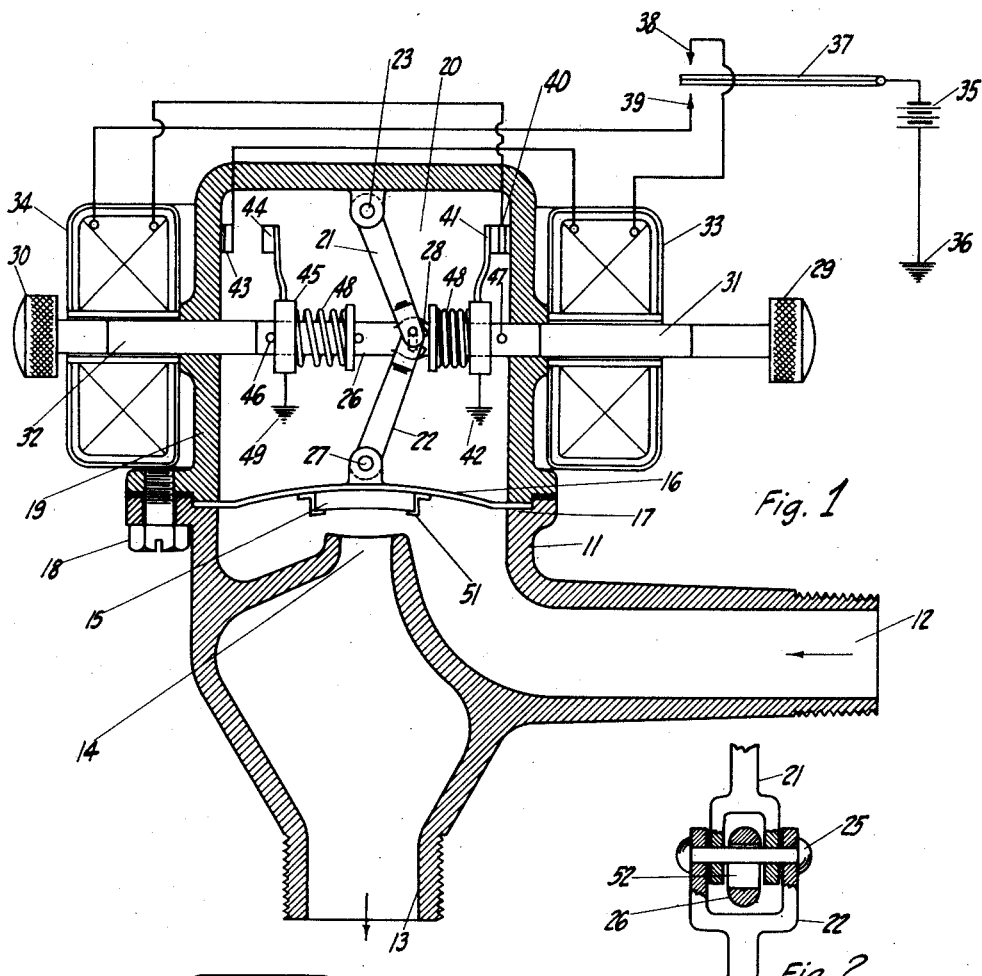
Figure 1 is a sectional view of a valve embodying my invention, together with a diagrammatic representation of the operating mechanism.

In Fig. 1, a valve casing 11 is disclosed, having an inlet aperture 12 and an outlet aperture 13. The passageway between these two apertures is controlled by the aid of a valve opening 14 formed intermediate the two openings 12 and 13, and arranged so that it may be closed by movement of a valve closure member 15.

The member 15 is preferably made from appropriately flexible material, such as rubber or the like. The movement of the valve closure 15 toward and from the aperture 14, is accomplished by the aid of the buckled diaphragm 16 which is securely clamped in a seat 17 provided therefor in the valve body 11 adjacent the valve opening 14. The clamping of this buckled diaphragm 16 is accomplished by the aid of a plurality of screws or bolts 18, which serve to tighten the flange of a member 19 against the edges of the diaphragm 16. The closure 15 is shown as fastened to the bottom of a diaphragm 16 by the aid of a series of clips 51.

In the position indicated, the diaphragm 16 is buckled upwardly, whereby the closure 15 is moved away from the opening 14, and the valve is open. This is one of the two stable positions of the biased spring member 16. Its other stable position may be secured at will by urging diaphragm 16 downwardly until it snaps over center and moves the closure 15 downwardly on top of the wall surrounding opening 14, thus closing the valve.

Figure 2:
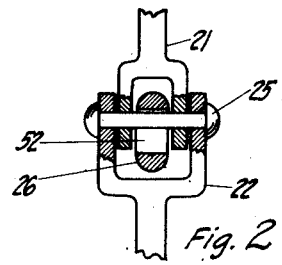
Fig. 2 is a detail view partly in section, of portion of the mechanism illustrated in Fig. 1.

It is to be noted that the operation of the valve is secured without the necessity of providing packings for any moving parts. The change in form of diaphragm 16 can be accomplished by the provision of a force entirely external of the valve chamber. This force may be applied manually by the aid of an appropriate mechanism. Preferably for this purpose I provide a toggle mechanism, for it has advantages which will become evident as the description proceeds. For instance, the member 19 may be formed to provide a space 20 in which most of the operating mechanism can be housed. The toggle includes a pair of links 21 and 22. The link 21 is pivoted on a stationary pivot 23 formed on the member 19. The other end of link 21 is pivotally connected to the link 22 in the manner most clearly illustrated in Fig. 2. In this figure, it is seen that the pivot pin 25 extends through the bifurcated ends of the links as well as through a slot 52 in rod 26. The other end of link 22 is pivoted to the ear 27 on the diaphragm 16. Stops 28 are provided on both links in order to limit the breaking movement of the toggle when the knuckle pivot is urged to the left of that shown in Fig. 1, and to hold it substantially in straightened position.

The rod 26 is arranged to be moved manually in either one or the other direction, in order to operate the toggle. For this purpose it has extensions forming buttons or knobs 29 and 30 and is slidably supported in the member 19.

By pushing button 29 it is evident that the toggle will be straightened, and by proper proportioning of the parts of this toggle, movement can be made such as to cause the diaphragm 16 to bulge downwardly, and to close the valve opening 14. In this position the toggle 21—22 is bent slightly beyond its straightened position, whereby a large resistance is opposed to the opening of the valve; for even when a large pressure is exerted against the bottom of closure 15 by the fluid, this pressure merely serves to place the links 21 and 22 under compression and will have no tendency to break the toggle. Preferably this condition is attained when the closure 15 is itself under compression, whereby a firm seating is obtained.

In Fig. 1, I illustrate a scheme for optionally operating the rod 26, by the aid of electromagnetism. For this purpose, sections 31 and 32 of magnetic material are included in the rod 26, which are arranged to act as cores for a pair of electromagnets 33 and 34 respectively. These magnets may be appropriately fastened or supported externally of member 19. As illustrated, the axial displacement of the cores 31 and 32 is such that when one of them, such as 31, is in attracted position, the other one will be in a position to be moved axially by the magnet 34 when it is energized to operate the valve. The source of energy for the magnets 33 and 34 is represented in this instance by the battery 35, having a grounded terminal 36.

In the present instance I also provide that these magnets be automatically operated in accordance with temperature conditions. Such an arrangement can be advantageously used in connection with valves for controlling hot water or steam radiators in rooms. For this purpose, a bimetallic element 37 is used, connected to the upper terminal of battery 35 and arranged to play between a pair of stationary contacts 38 and 39. When the temperature of the room rises, contact is made between the element 37 and the contact 39. The circuit for magnet 34 will then be completed through the following parts: ground 36, battery 35, bimetallic element 37, contact 39, magnet winding 34, a stationary contact 40 insulatingly supported inside the space 20, a movable contact 41 supported on rod 26, thence to ground 42. The core 32 will then be pulled to the left, straightening the toggle and closing the valve, by means of the mechanical connection between slot 52 and pivot pin 25. At the same time, contact is broken between contacts 40 and 41, whereby this circuit is opened as soon as the valve is closed. Simultaneously, contact is made between the stationary contact 43 and the movable contact 44. The movable contacts 41 and 44 are supported on slidable collars such as 45 which are urged towards stop pins 46 and 47 by the aid of the helical springs 48. The arrangement is such that these springs will be only slightly compressed when contact is made.

The connection between contacts 43 and 44 places the system in proper condition to operate the valve to open position, in response to a cooling of the room. When this occurs, strip 37 engages contact 38, whereby the circuit thru the magnet 33 is completed through the following parts: ground 36, battery 35, strip 37, contact 38, magnet 33, contacts 43 and 44, to ground 49. When this circuit is energized, core 31 is pulled to the position illustrated, and the valve is opened. This cycle of operation continues as often as there is sufficient variation in the room temperature.

It will be noted that the sets of contacts 40, 41 and 43, 44 are operated in such manner that they set the circuit for the succeeding operation; also that manual operation can be effected whenever desired, independently of the automatic operation.

Figure 3:
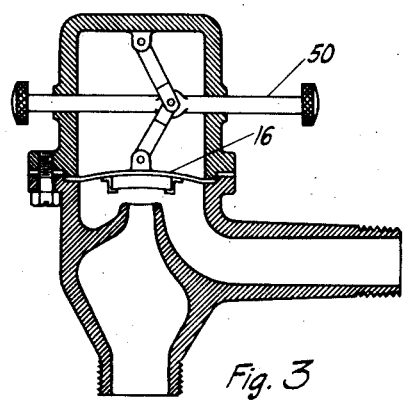
Fig. 3 is a diagrammatic sectional view of a modified simplification of the valve.

In Fig. 3, a manually operated valve structure is disclosed, which is entirely similar to that shown in Fig. 1. In this instance the electromagnets 33 and 34 and their co-operating elements are omitted. Instead, the rod 50 is arranged to be operated manually only.

The resilience of diaphragm 16 in this embodiment serves to retain the toggle in the broken position shown; when the valve is closed by having the rod 50 urged to the left, the resilience of this diaphragm 16 operates in the opposite direction to maintain the valve closed, and the toggle itself opposes any attempt to open the valve.

The advantages of the present invention are self-evident, without further extended discussion. The parts can all be inexpensively manufactured; the valve may be quickly and easily operated, and it is free from danger of leaks in service.

I claim:

1. In a valve, means forming a valve opening, a closure for the opening, and a biased spring member for operating the closure after said spring member has been actuated, said member being formed of a resilient sheet and having two stable positions, one on each side of a center, corresponding to open and closed positions of the valve.

2. In a valve, means forming a valve opening, a closure for the opening, and a biased spring member for operating the closure, said member and the valve casing serving to define a space enclosing said valve opening and closure, said member having two stable positions, one on each side of a center, corresponding to open and closed positions of the valve.

3. In a valve, a valve casing having a valve opening, a closure for the opening, a biased spring member for operating the closure after said spring member has been actuated, said member serving, with the casing, to define a valve chamber and means for clamping the spring member tightly against the casing, whereby the need of valve packing is obviated.

4. The combination as set forth in claim 3, with means, external of the casing, for biasing the spring member in either direction to operate the valve.

5. In a valve, a valve casing having a valve opening, a closure for the opening, a biased spring member for operating the closure, said member having two stable positions, one on each side of a center, corresponding to open and closed positions of the valve, and being of sufficient size to cover an opening in the valve casing, means for clamping the spring member tightly against the casing, and a toggle mechanism exterior of the casing for urging the spring member toward either of its stable positions.

6. The combination as set forth in claim 5 with electromagnetic means for operating the toggle in either direction.

7. In a valve, a valve casing having a valve opening, a closure for the opening, and a resilient member forming an exterior fluid tight wall for the casing and means for actuating said member, whereby the resilience of said member mechanically operates the closure.

8. In a valve, a valve casing having a valve opening, a closure for the opening, a biased spring diaphragm having two stable buckled positions, one on each side of a center, for operating the closure, and a toggle mechanism for buckling the diaphragm in either direction, said toggle being slightly past its center when the valve is closed, whereby pressure against the closure is prevented from opening the valve.

9. In a valve, means forming a valve opening, a closure for the opening, a resilient member for operating the closure and having two stable positions corresponding to open and closed positions of the valve, said member resiliently holding the closure against the opening in the closed position, and a toggle mechanism for moving the resilient member toward either of said positions, said mechanism including a stop to hold it slightly beyond its straightened position when the resilient member is in closing position.

In testimony whereof I have hereunto set my hand.

JOHN FLAM.